(No Model.)

F. REYNER.
SEED SOWER.

No. 331,547. Patented Dec. 1, 1885.

Witnesses.
Elihu B. Stowe
Carl W. Oser

Inventor
Francis Reyner.
By Joshua B. Webster Atty.

UNITED STATES PATENT OFFICE.

FRANCIS REYNER, OF LATHROP, CALIFORNIA.

SEED-SOWER.

SPECIFICATION forming part of Letters Patent No. 331,547, dated December 1, 1885.

Application filed June 9, 1885. Serial No. 168,121. (No model.)

*To all whom it may concern:*

Be it known that I, FRANCIS REYNER, a citizen of the United States, residing at Lathrop, in the county of San Joaquin and State of California, have invented certain new and useful Improvements in Seed-Sowers, of which the following is a specification, reference being had therein to the accompanying drawings.

Figure 1:
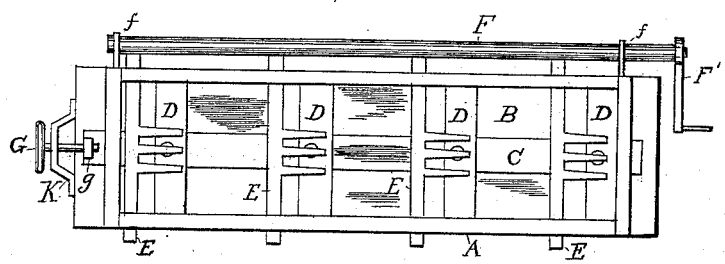
Figure 2:
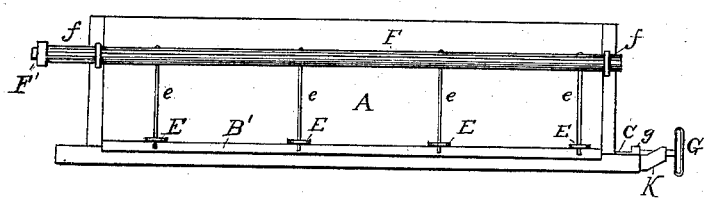
Figure 3:
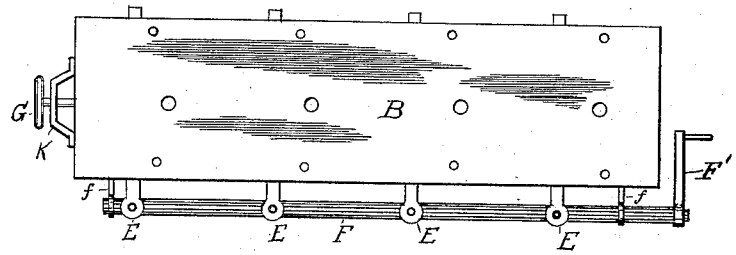

Figure 1 is a top view of my improved seed-sower. Fig. 2 is a rear elevation. Fig. 3 is a view of the bottom.

The object of my invention is to furnish a broadcast seed-sower that shall be simple in construction and convenient in use, being not liable to get out of order and inexpensive to repair.

A represents the seed box or hopper in which the seed is put, having a bottom, B, screwed to it. The bottom B is mortised on top for the reception of a false bottom, B'. The false bottom B' is suitably mortised longitudinally for the reception of a sliding metal plate C. Cross metal plates D are placed at regular intervals on top of the plate C. Agitating-plates E, provided with prongs and moving back and forth through interstices along the top edges of false bottom B', are connected at one end with shaft F by pins *e*. The shaft F has its bearings in boxes *f* attached to front of seed box or hopper A, near its ends. The plates D C and bottoms B B' are provided with openings for the escape of the seed, which openings are so controlled as to measure by a turn-screw, G, located at one end of the seed-box or hopper in a standard, K, and having a threaded end connected with a nut, *g*, in end of slide-plate C. The shaft F has a crank, F', which may be connected by a pitman with the wheel of any vehicular attachment. The seed is placed in the seed box or hopper A. The amount to be sown is determined by the position over the escape holes of the slide-plate C, controlled by the turn-screw G. The roller F being set in motion moves the agitating-plates E back and forth over the escape-holes, the prongs of the plates serving to push the seed through the holes.

I am aware that some of the features I have described are not new; but

What I claim as being of my invention is—

The combination of the seed-box having a perforated bottom with the adjustable plate C, the plate D, and agitator E, arranged at right angles thereto, and the shaft F, provided with arms for moving the agitator E, substantially as shown.

In testimony whereof I affix my signature in presence of two witnesses.

FRANCIS REYNER.

Witnesses:
 ELIHU B. HOWE,
 JOSHUA B. WEBSTER.